(12) United States Patent
Makino et al.

(10) Patent No.: US 9,046,624 B2
(45) Date of Patent: Jun. 2, 2015

(54) INFRARED SECURITY SENSOR

(71) Applicant: OPTEX CO., LTD., Otsu-shi, Shiga (JP)

(72) Inventors: Hiroshi Makino, Otsu (JP); Koji Hayashide, Otsu (JP)

(73) Assignee: OPTEX CO., LTD., Shiga (JP)

( * ) Notice: Subject to any disclaimer, the term of this patent is extended or adjusted under 35 U.S.C. 154(b) by 1 day.

(21) Appl. No.: 13/752,830

(22) Filed: Jan. 29, 2013

(65) Prior Publication Data
US 2013/0193323 A1 Aug. 1, 2013

(30) Foreign Application Priority Data
Jan. 31, 2012 (JP) .................... 2012-017662

(51) Int. Cl.
*G01V 8/12* (2006.01)
(52) U.S. Cl.
CPC ....................... *G01V 8/12* (2013.01)
(58) Field of Classification Search
CPC .. G08B 13/19; G08B 13/189; G08B 13/1895; G01V 8/12
USPC ........... 340/541, 552, 555, 556, 506; 250/221
See application file for complete search history.

(56) References Cited

U.S. PATENT DOCUMENTS

| 6,919,567 | B2 | 7/2005 | Iwasawa | |
|---|---|---|---|---|
| 2003/0058104 | A1* | 3/2003 | Iwasawa et al. | 340/556 |
| 2003/0141454 | A1 | 7/2003 | Iwasawa | |
| 2005/0168711 | A1* | 8/2005 | Iwasawa | 353/122 |
| 2006/0139245 | A1* | 6/2006 | Sugiyama | 345/60 |
| 2007/0091434 | A1* | 4/2007 | Garner et al. | 359/459 |

FOREIGN PATENT DOCUMENTS

JP 3959461 B2 8/2007

* cited by examiner

Primary Examiner — Yara B Green
(74) Attorney, Agent, or Firm — Sughrue Mion, PLLC

(57) ABSTRACT

An infrared security sensor device includes a light projector 1A, 1B having a projecting light power control unit 5 for controlling the light receiving sensitivity of a light receiver 2A, 2B by switching a light projecting power thereof to one of a plurality of steps in dependence on the level of a detection signal and a status determining unit 7 for determining an optical axis adjusting time and an alert time. The light projector 1A, 1B is further provided with an adjustment selecting sector 6 capable of selecting one of the manual and automatic adjusting sectors 10 and 11 such that during the optical axis adjustment the light projecting power can be manually adjusted by the manual adjusting sector 10.

5 Claims, 3 Drawing Sheets

INFRARED SECURITY SENSOR

CROSS REFERENCE TO THE RELATED APPLICATION

This application is based on and claims Convention priority to Japanese patent application No. 2012-017662, filed on Jan. 31, 2012, the entire disclosure of which is herein incorporated by reference as a part of this application.

BACKGROUND OF THE INVENTION

1. Field of the Invention

The present invention relates to an infrared security sensor device of a kind equipped with a light projecting unit for projecting an infrared beam for object detection purpose, a light receiving unit for receiving the projected infrared beam and then outputting a detection signal, and an optical alignment unit for adjusting an optical axis between the light projecting unit and the light receiving unit.

2. Description of the Prior Art

The infrared security sensor device of an active type generally includes a light projecting unit having a light projecting element, a light receiving unit having a light receiving element and a sighting device and is so designed that when the light receiving unit receives an infrared beam projected from the light projecting unit, a detection signal is outputted to allow an object to be detected as light therebetween is intercepted, with a warning outputted subsequently. In this case, the sighting device is utilized to accomplish the adjustment of an optical axis between the light projecting unit and the light receiving unit and, while the sighting devices provided respectively in the light projecting unit and the light receiving unit are viewed, respective angles of a light projecting direction and a light receiving direction are manually adjusted to accomplish a rough adjustment of the optical axis with naked eyes. After this rough adjustment, the optical axis is finely adjusted so that the level of the detection signal may attain a value equal to or higher than a predetermined value.

In this type of the security sensor device, since because of a condition of use, including the axis-to-axis distance of the light projecting unit and the light receiving unit, and/or a change of environments around the site of installation such as, for example, a change in environment, the light receiving unit then receiving the light is unable to detect the interception of the infrared beam, there is the possibility that a failure to warn will occur during an alert time. By way of example, a situation, in which infrared rays of light impinged upon the light receiving unit, may be apt to occur because of a wraparound phenomenon, in which rays of light are projected from the light projecting unit and the infrared beam reflected by a wall surface or a ground surface between the light projecting unit and the light receiving unit impinges upon the light receiving. The degree of allowance required for a detecting unit keeps its alert status even though an environmental condition of the site of installation of the detecting unit gets worse is referred to as a sensitivity allowance. In general, the light receiving level (light receiving sensitivity), which is a signal level detected by the light receiving unit, is controlled by an AGC (Automatic Gain Control Circuit) of an amplifier on the side of the light receiving unit. In contrast thereto, as a security sensor device for controlling the light receiving sensitivity of the light receiving unit with a projected light power on the side of the light projecting unit in dependence of the above described site environment, an active type infrared security sensor device has been well known (such as disclosed in, for example, the patent document 1 listed below), in which when the light receiving unit saturates because of an excessive light projecting power, the light projecting power is lowered in a plurality of steps to allow the light receiving sensitivity of the light receiving unit to be automatically controlled. With a sensor for controlling on the side of the light projecting unit, the light intensity of the wraparound infrared beam or stray light can be lowered by controlling the light projecting power in the plurality of steps in a manner similar to the gain adjustment on the side of the standard light receiving unit. Also, because of the control to the optimum light projecting power, the amount of electricity consumed can be reduced and the durability can be increased by reducing the load on circuit component parts including elements of the light projecting unit.

PRIOR ART LITERATURE

[Patent Document 1] Japanese Patent No. 3959461

It has, however, been found that in the security sensor device of a light projecting power control type, assuming that the device, in which the light receiving sensitivity is set for the axis-to-axis distance of, for example, 100 meters between the light projecting unit and the light receiving unit, is used for the axis-to-axis distance of 10 meters ($\frac{1}{10}$), the light receiving sensitivity of the light receiving unit will be 100 times that when it is installed at the axis-to-axis distance of 100 meters. In such case, when the sensitivity allowance as defined above is, for example, 100 times at the axis-to-axis distance of 100 meters, the sensitivity allowance at the axis-to-axis distance of 10 meters is 10,000 times. Thus, since the width of change of the sensitivity allowance for each step of a plurality of axis-to-axis distances is extremely large, in a display unit for displaying the detection signal level by means of, for example, display lamp (level indicators) a number of display lamps for the display of the level corresponding to the number of the steps are required.

On the other hand, during the optical axis adjustment, when the light receiving unit saturates because of a high detection signal level, the light projecting power of the light projecting unit is lowered stepwise to allow the detection signal level to be lowered as compared with that during the previous cycle, but when the light receiving unit still saturates, the light projecting power has to be further lowered and this procedure is repeated to reduce the detection signal level so that the optical axis may align with the peak of the latter. For this reason, when the light projecting power is automatically varied in the plurality of steps during the optical axis adjustment, a plurality of level displays in the display unit considerably move up and down automatically according to the steps thereof and, therefore, because of a large change in level displays under a condition in which no specific step is not clear, the attendant worker will be unnecessarily annoyed and, thus, it will often occur that the optical adjustment is difficult to achieve.

SUMMARY OF THE INVENTION

In view of the foregoing, the present invention has been devised to eliminate the problems and inconveniences in the prior art security devices discussed above and is intended to provide an infrared security sensor device capable of facilitating the optical axis easily and smoothly when the light receiving sensitivity is to be controlled by means of a light projecting power control.

In order to accomplish the foregoing object, the present invention provides an infrared security sensor device for detecting a change in a detection signal level, caused by the interception of infrared rays of light, to detect an object and then issuing a warning, which sensor device, which sensor device includes a light projector for projecting infrared rays of light for object detection purpose; a light receiver for receiving the projected infrared rays of light and then outputting a detection signal; and an optical axis adjusting unit for adjusting a projecting light direction of the light projector and a receiving light direction of the light receiver. The light projector referred to above includes a light projecting power control unit for controlling the light receiving sensitivity of the light receiver by switching the light projecting power of such light projector to one of a plurality of steps on the basis of the level of the detection signal and a status determining unit for determining one of an optical axis adjustment status and an alarm status. The light projecting power control unit referred to above also includes a manual adjusting sector and for manually adjusting the switching of the steps of the light projecting power during an optical axis adjustment and an automatic adjusting sector for automatically adjusting the switching of the steps of the light projecting power during the optical axis adjustment. The light projector referred to above is provided with an adjustment selecting sector capable of selectively selecting one of the manual adjusting sector and the automatic adjusting sector, the stepwise switching of the light projecting power being manually adjusted by the manual adjusting sector during the optical axis adjustment.

According to the present invention, since when the detection signal level (light receiving sensitivity) is adjusted by means of the light projecting power control, the manual adjustment of the light projecting power can be selected in the plurality of the steps at the time of the optical axis adjustment, a change occurring in the level display for each of the selected steps can be clearly confirmed and there is no possibility that the level display considerably changes without knowing the steps such as observed in the conventional art, and, therefore, the attendant worker is prevented from being unnecessarily annoyed or confused. Accordingly, when the light receiving sensitivity is to be adjusted by means of the light projecting power, the optical axis adjustment can be easily and smoothly accomplished.

In a preferred embodiment of the present invention, the light projector and the light receiver may have respective removable coverings; in which case the light projecting power control unit includes a covering transmittance adjusting sector for automatically adjusting the light projecting power in dependence on the amount of the light transmittance reduced by the covering, in addition to the manual adjustment or the automatic adjustment of the light projecting power during the optical axis adjustment, under a condition in which the coverings of the light projector and the light receiver are removed, when the coverings are mounted on the light projector and the light receiver subsequent to termination of the optical axis. Accordingly, the reduction of the light projecting power caused by the mounting of the covering can be automatically compensated for.

In another preferred embodiment of the present invention, the light projecting power control unit may include an automatic adjusting sector for automatically adjusting the stepwise switching of the light projecting power at the time of the alert status such that in dependence on an environment of a site of installation the light projecting power of the light projector is automatically switched to one of the plurality of the steps at the time of the alert status. The light projecting power control unit referred to above may also include a manual adjusting sector for manually adjusting the stepwise switching of the light projecting power at the time of the alert status such that in dependence on an environment of a site of installation the light projecting power of the light projector is manually switched to one of the plurality of the steps at the time of the alert status. It is to be noted that the environment of the site of installation referred to above is to be construed as meaning the condition of use including the axis-to-axis distance of the light projector and the light receiver, and/or a change in environment such as, for example, a building wall surface and/or a ground surface caused by, for example, rain and/or snow. Accordingly, it is possible to select, when the necessity arises, which one of the automatic adjusting sector and the manual adjusting sector, adjusted by manually, should be put into operation.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
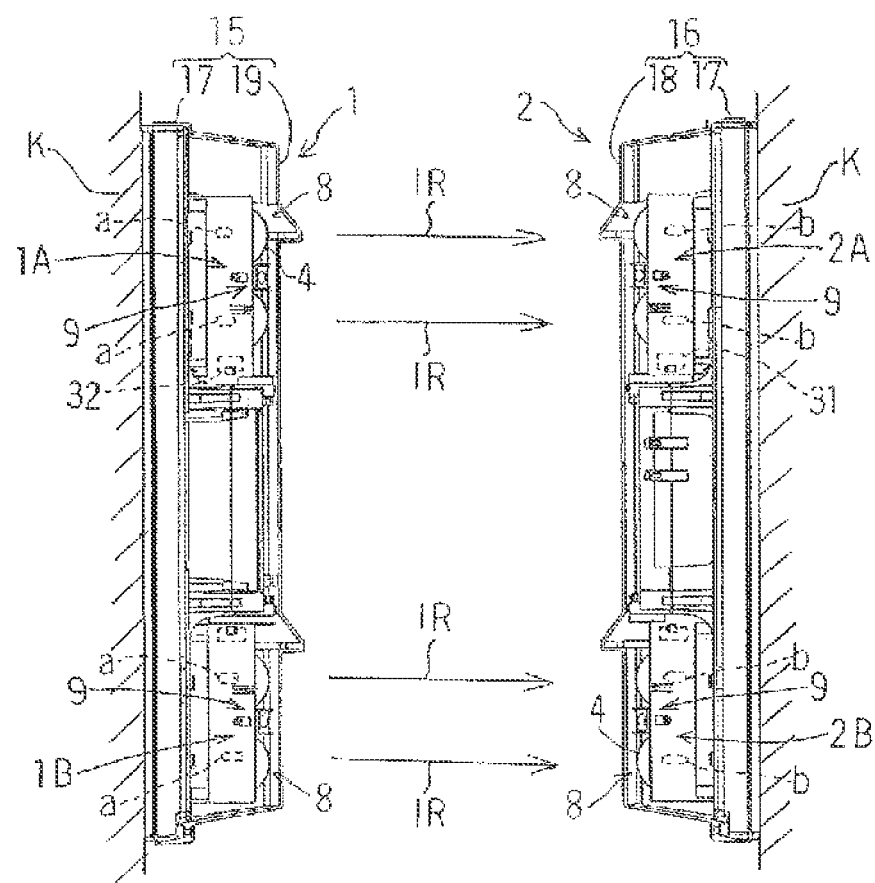
FIG. 1 is a schematic side view showing an infrared security sensor device according to a preferred embodiment of the present invention.
Figure 2B:
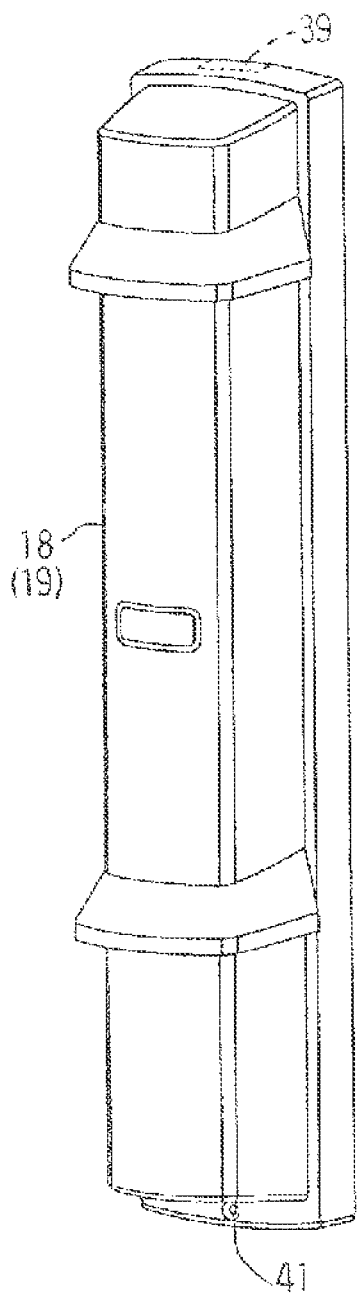
FIG. 2B is a perspective view showing the covering of the light projecting unit.
Figure 2A:
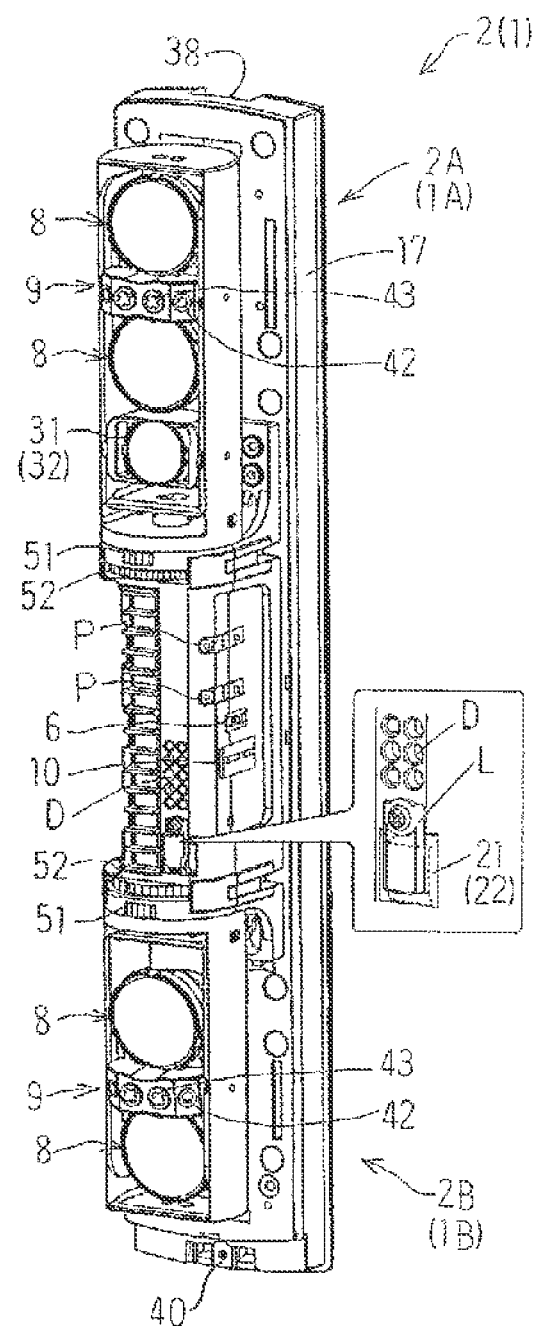
FIG. 2A is a perspective view showing a light projecting unit (a light receiving unit) of the infrared security sensor device, shown in FIG. 1, with a covering removed.

Hereinafter, a preferred embodiment of the present invention will be described in detail with reference to the accompanying drawings. In particular, FIG. 1 illustrates a schematic side view of an infrared security sensor device designed in accordance with the preferred embodiment of the present invention; FIG. 2A illustrates, in a perspective representation, a light projecting unit (a light receiving unit) of the infrared security sensor device with a covering removed; and FIG. 2B illustrates the covering of the light projecting unit. As shown in FIG. 1, the infrared security sensor device includes a light projecting unit 1 and a light receiving unit 2. The light projecting unit 1 in turn includes first and second light projectors 1A and 1B positioned one above the other and each made up of first and second light projecting elements a and a such as, for example, infrared light emitting diodes, whereas the light receiving unit 2 in turn includes first and second light receivers 2A and 2B each made up of first and second light receiving elements b and b for receiving infrared rays of light projected respectively from the light projectors 1A and 1B. The light projecting element a or the light receiving element b cooperates with a lens 4 to form an optical system 8.

The light projecting unit 1 and the light receiving unit 2 are accommodated respectively within main body casings 15 and 16 and are amounted on a support member K such as, for example, a building wall or a support pole. Each of the main body casings 16 and 15 of the light receiving and projecting units 2 and 1 is made up of a chassis 17 and a removable covering 18 or 19 made of a resinous material and used to cover the associated chassis 17. As shown in FIGS. 2A and 2B, the covering 18 has an upper portion formed with an engagement projection 39 with which an engagement step 38 of the chassis 17 is engaged, and the covering 18 has a lower portion through which a set screw 41 is threaded into a screw hole 40 defined in the chassis 17. Accordingly, when after the engagement projection 39 at the upper portion of the covering 18 has been engaged with, for example, the engagement step 38 of the chassis 17, the set screw 41 is threaded through the lower portion of the covering 18 into the screw hole 40 in the chassis, the covering 18 can be coupled with the chassis 17.

The infrared security sensor device shown in FIG. 1 is so designed and so configured that when infrared rays of light (IR) projected from, for example, the light projector 1A are intercepted, an object to be detected can be detected in reference to a change in signal level of a detection signal received by the light receiver 2A that is opposed thereto.

In the embodiment now under discussion, the light projecting unit 1 is shown and described as formed integrally with the upper and lower light projectors 1A and 1B positioned one above the other whereas the light receiving unit 2 is shown and described as formed integrally with the upper and lower light receivers 2A and 2B positioned one above the other, but they may be provided as separated in a vertical direction, or only a combination of the light projector 1A and the light receiver 2A or a combination of the light projector 1B and the light receiver 2B may be employed.

Both of the light projectors 1A and 1B and the light receiver 2A and 2B have the same optical axis adjusting unit for changing the angle of a light projecting direction of the light projectors and the angle of a light receiving direction of the light receivers on the basis of the levels of respective detection signals thereof to thereby accomplish the optical adjustment. In performing the optical adjustment, while a sighting device 9 provided in each of the light projectors and the light receivers is viewed, the light projecting and receiving directions of the optical system are manually altered to allow the optical axis to be roughly adjusted with naked eyes. After this rough adjustment, the optical axis is finely adjusted so that the detection signal level may attain a value equal to or higher than a predetermined value.

The light projecting and receiving units 1 and 2 are so configured as to have the same appearance as shown in FIGS. 2A and 2B and, therefore, reference will now be made only to the light receiving unit 2 as a representative. The light receiver 2A includes a sighting device 9 for rough adjustment of the optical axis and this sighting device 9 has left and right viewing windows 42 for viewing from lateral sides of the light receiving unit 2A, a marking 43 formed in a front surface, a mirror disposed within an interior (not shown) for looking the light projector 1A, an objective lens, and an eyepiece lens having a microlens. When the optical axis adjustment is to be performed, the attendant worker has to view through the viewing windows 42 one at a time and then manually turn a dial 51 for adjusting the horizontal angle of the light receiving direction and a dial 52 for adjusting the vertical angle to thereby adjust the direction of the optical axis.

Also, the light projecting and receiving units 1 and 2, both shown in FIG. 1, has a communicating function and, therefore, the detection signal level and a removal signal rc of the covering 18, as will be described later, are transmitted from a transmitter 31 of the light receiving unit 2 to a receiver 32 of the light projecting unit 1. As shown in FIGS. 2A and 2B, the transmitter 31 and the receiver 32 are disposed at a location substantially intermediate between the light receiving unit 2 and the light projecting unit 1.

At a front intermediate portion of the light receiving unit 2 shown in FIGS. 2A and 2B, there is provided a cover (tamper) switch 21 capable of being switched on when the covering 18 is mounted, but being switched off when the covering 18 is removed. This switched-off (removal) signal rc is transmitted to the light projecting unit 1 and is then inputted to a status determining unit 7 shown in FIG. 3. The light projecting unit 1 is also provided with a covering (tamper) switch 22 that is switched off when the covering 19 is removed. This switched-off (removal) signal rc is also inputted to the status determining unit 7 shown in FIG. 3. Each of those covering switches 21 and 22 is provided inside the respective covering 18 and 19 with a rib (not shown) projecting outwardly and, hence, when the coverings 18 and 19 are mounted, such ribs press respective main bodies of those switch to switch them on. It is to be noted that each of the covering switches 21 and 22 is provided with a locking plate L capable of holding the respective main bodies of the switches in a pressed condition at all times and, therefore, the alert status can be established at all times upon mounting of the lock plates L.

Figure 3:
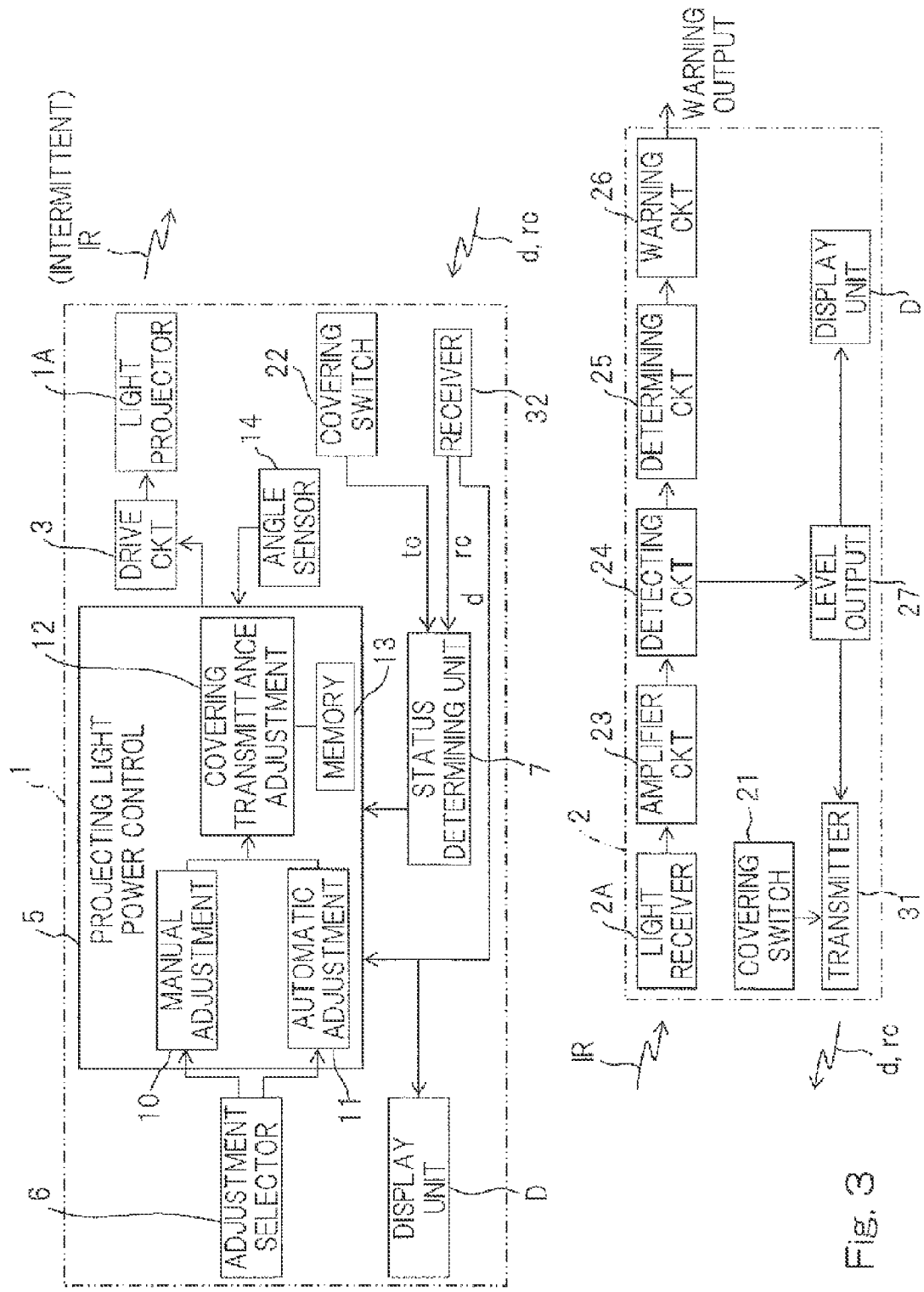
FIG. 3 is a circuit block diagram showing the infrared security sensor device shown in FIG. 1.

FIG. 3 illustrates a circuit block diagram of the infrared security sensor device of the structure shown in FIG. 1. Although in describing this embodiment only the light projector 1A and the light receiver 2A are shown, even the light projector 1B and the light receiver 2B have structures similar to those of the light projector 1A and the light receiver 2A, respectively. As shown in FIG. 3, the light projecting unit 1 is provided with a light projector 1A for projecting, as an infrared beam IR, infrared ray of light generated from the light projecting element a, a drive circuit 3 for driving the light projector 1A, and a projecting light power control unit 5 for controlling the light receiving sensitivity of the light receiver 2A by switching the light projecting power of the light projector 1A in a plurality of steps on the basis of the level of the detection signal. The drive circuit 3 drives the light emitting element a at a predetermined frequency to cause the light emitting element a to emit the infrared beam IR in the form of a pulse modulated wave. The projecting light power control unit 5 controls the light projecting power by means of a PWM control scheme for controlling, for example, an output timing of a light projecting pulse of a predetermined frequency.

The light projecting unit 1 includes the status determining unit 7 for determining an optical axis adjusting status or time and an alert status or time. This status determining unit 7 is operable in such a manner that, for example, when both of the covering 18 of the light receiving unit 2, shown in FIGS. 2A and 2B, and the covering 19 of the light projecting unit 1, also shown in FIGS. 2A and 2B, are removed with the corresponding covering switches 21 and 22 issuing respective switched-off signals, the status determining unit 7 determines a condition under the optical axis adjusting time, but when both of the coverings 18 and 19 are mounted with the corresponding covering switches 21 and 22 held in position not to issue the respective switched-off signals, the status determining unit 7 determines a condition under the alert time.

When both of the coverings 18 and 19 are removed, IR of an intermittent signal indicative of the optical axis adjusting time is outputted to the light receiver 2A, but when both of the coverings 18 and 19 are mounted, IR of an ordinary signal, not the intermittent signal, indicative of the alert time is outputted. The intermittent signal and the ordinary signal, both being IR, are detected by a detecting circuit 24 of the light receiving unit 2 in dependence on the signal type.

The projecting light power control unit 5 referred to previously includes a manual adjusting sector 10 for manually adjusting a step switching of the light projecting power during the optical adjustment and an automatic adjusting sector 11 for automatically adjusting it. The manual adjusting sector 10 allows the step switching to be performed manually to adjust to an optimum light receiving sensitivity for each of the steps. On the other hand, the automatic adjusting sector 11 automatically adjust to the optimum light receiving sensitivity successively in dependence on the detection signal level for each step over all steps. An adjustment selecting sector 6 for selecting the manual adjusting sector 10 and the automatic adjusting sector 11 one at a time is provided in the light projecting unit 1 and, by means of the manual adjusting sector 10, the switching of the steps of the light projecting power during the optical adjusting time can be manually adjusted.

As shown in FIGS. 2A and 2B, by means of the adjustment selecting sector 6 such as, for example, a dip switch, one of the automatic adjustment (AUTO) and the manual adjustment (MANUAL) can be selected. The manual adjusting sector 10 such as, for example, a slide switch can switch the light projecting power to one of the steps including, for example, high (200 meters), medium (100 meters) and low (50 meters) in dependence on the distance during the manual adjustment. The light receiving sensitivity is automatically searched for the light projecting power for each of the steps in dependence on the detection signal level. A display unit D displays the detection signal level during the optical adjusting time and that during the alert time. In this embodiment, a display lamp (level indicator) is employed, but a buzzer or any other sound may be used.

In this instance, the projecting light power control unit 5 is switched by the automatic adjusting sector 11 to the alert time and, depending on the environment at the site of installation, the light projecting power of the light projector is automatically stepwise switched. The environment of the site of installation referred to above is to be understood as meaning the condition of use including the axis-to-axis distance of the light projector and the light receiver, and/or a change in environment such as, for example, a building wall surface and/or a ground surface caused by, for example, rain and/or snow. A memory 13 of the light projecting power control unit 5 stores therein a component of the light transmittance, which is lowered by the coverings 18 and 19, and a conversion chart of the light projecting power that is used to compensate for the component of the light transmittance that has been lowered. Also, the light projecting unit 1 is provided with an angle sensor 14 (although not shown, the light receiving unit 2 is similarly provided with it) and the light projecting direction of the light projector 1A and the light receiving direction of the light receiver 2A, obtained from this angle sensor 14, and a conversion chart with the transmittances 18 and 19 of the coverings are also stored.

A covering transmittance adjusting sector 12 adjusts to increase the light projecting power on the basis of the conversion chart stored in the memory 13 is operable that in the event that the status determining unit 7 determines the alert time with the respective coverings 18 and 19 of the light receiving and projecting units 2 and 1 mounted, in addition to the light projecting power for the manual adjustment or the automatic adjustment, the light projecting power is increased to adjust by only the amount of the light transmittance reduced by the coverings 18 and 19 on the basis of the conversion chart stored in the memory 13. By way of example, if the amount of the light transmittance reduced by the coverings is 20%, the light projecting power is multiplied by this transmittance of 20% and the light receiving sensitivity is increased 20%.

Also, as shown in FIGS. 2A and 2B, where the covering 18 (19) of the light receiving unit 2 (light projecting unit 1) is set with, for example, the projecting light receiving direction oriented in a slantwise direction and the angle of the light projecting direction of the light projector 1A and the angle of the light receiving direction of the light receiver 2A are detected by the angle sensor 14, the reduction in light transmittance caused by the covering is converted according to the angle on the basis of the conversion chart stored in the memory 13, and the light projecting power can therefore be adjusted.

On the other hand, in the light receiving unit 2, the light receiver 2A receives the infrared beam IR from the light projecting unit 1 and outputs an electric signal descriptive of the signal level proportional to the amount of the infrared beam received and this electric signal is then amplified by an amplifier circuit 23. In the detecting circuit 24, conversion into a signal proportional to the level of the received signal by only the pulse modulated wave with disturbing light components removed is performed. At this time, in dependence on the signal type of IR, the detection signal level (light receiving level) for the optical axis adjustment is outputted at the time of the intermittent signal, but a detection signal level (light receiving level) for the alert time is outputted at the time of the ordinary signal. The detection signal level proportional to the amount of the infrared rays received by the light receiver is outputted from a level output sector 27 and is then displayed by the display unit D and, at the same time, outputted to the transmitter 31 and then transmitted to the receiver 32 of the light projecting unit 1. Also, this detection signal level is outputted to the outside through a pin hole P shown in FIGS. 2A and 2B.

In performing the rough adjustment, while the attendant worker views the sighting device 9 provided in each of the light projector and the light receiver, the respective angles of the light projecting and receiving directions of the optical system 8 are manually altered by means of a dial, and the optical axis is adjusted while the attendant worker watches a display made by the display unit D of the detection signal level resulting from the projecting light power control. After this rough adjustment, the optical axis is finely adjusted so that the detection signal level may attain a value equal to or higher than the predetermined value. This fine adjustment may be carried out manually while the attendant worker looks, with the naked eyes, at a display given by a tester (not shown) with a monitor jack of such tester inserted into the pin hole P or it may be carried out automatically by an automatic angle adjusting unit (not shown) linked with dials 51 and 52.

Since the upper and lower light receiver 2A and 2B shown in FIG. 1 have their own optical systems 8, the optical system other than that for which the optical adjustment is performed is covered with a light shielding plate (not shown) at the time of the optical axis fine adjustment subsequent to the rough adjustment of the optical axis with the naked eyes as hereinbefore described. In this instance, since both of the light projectors 1A and 1B and the light receivers 2A and 2B have the respective optical axis adjusting units, the optical axis adjustment is carried out for each of the transmitters and receivers.

At the time of the alert status, the detection signal level from the detecting circuit 24 is determined by a determining circuit 25 as to whether it is equal to or lower than an intrusion detection level that has been preset. This determining circuit 25 outputs a detection signal in the event that the detection signal level is determined equal to or lower than the preset intrusion detection level when the infrared beam IR from the light emitting unit is intercepted by an unauthorized intruder. A warning circuit 26 is driven when the detection signal from the determining circuit 25 is inputted thereto, to thereby output to, for example, a security center (not shown) a warning signal necessary to inform the presence of the unauthorized intruder.

As hereinabove described, since the present invention is such that when the detection signal level (light receiving sensitivity) is adjusted by means of the projecting light power control, the manual adjustment of the light projecting power can be selected in the plurality of steps during the light adjustment, a change of the level displays for each of those steps can be ascertained, but there is no possibility of the level displays changing while the particular steps is uncertain, and, therefore, there is no possibility that the attendant worker may be unnecessarily annoyed. Accordingly, when the light receiving sensitivity is adjusted by means of the projecting power control, the optical axis adjustment can be easily and smoothly carried out.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the embodiment hereinbefore described the light projecting power control unit has been described as switched to the automatic adjusting sector at the alert time, it may be switched to the manual adjusting sector so that the light projecting power of the light projector can be manually switched in a plurality of steps in dependence on the environment of the site of installation. Also, depending on the necessity, the use of the automatic adjusting sector may be disposed with and only the manual adjusting sector may be employed. In such case, reduction in cost of the security sensor device can be obtained.

Accordingly, such changes and modifications are, unless they depart from the scope of the present invention as delivered from the claims annexed hereto, to be construed as included therein.

REFERENCE NUMERALS

1 . . . Light projecting unit
1A, 1B . . . Light projector
2 . . . Light receiving unit
2A, 2B . . . Light receiver
5 . . . Light projecting power control unit
6 . . . Adjustment selecting sector
7 . . . Status determining unit
10 . . . Manual adjusting sector
11 . . . Automatic adjusting sector
12 . . . Cover transmittance adjusting sector
18 . . . Covering of the light receiving unit
19 . . . Covering of the light projecting unit
D . . . Display unit

What is claimed is:

1. An infrared security sensor device for detecting a change in a detection signal level, caused by the interception of infrared rays of light, to detect an object and then issuing a warning, which sensor device comprises:

a light projector for projecting infrared rays of light for object detection purpose;
a light receiver for receiving the projected infrared rays of light and then outputting a detection signal; and
an optical axis adjusting unit for adjusting a projecting light direction of the light projector and a receiving light direction of the light receiver;
in which the light projector comprises a light projecting power control unit for controlling the light receiving sensitivity of the light receiver by switching the light projecting power of such light projector to one of a plurality of steps on the basis of the level of the detection signal and a status determining unit for determining one of an optical axis adjustment status and an alarm status;
in which the light projecting power control unit includes a manual adjusting sector and for manually adjusting the switching of the steps of the light projecting power during an optical axis adjustment and an automatic adjusting sector for automatically adjusting the switching of the steps of the light projecting power during the optical axis adjustment; and
in which the light projector is provided with an adjustment selecting sector capable of selectively selecting one of the manual adjusting sector and the automatic adjusting sector, the stepwise switching of the light projecting power is manually adjusted, for each of the steps in dependence on distance between the light projecting unit and the light receiving unit by the manual adjusting sector during the optical axis adjustment, and the automatic adjusting sector, successively with the manual adjusting sector, automatically adjusts the light receiving sensitivity in dependence on the detection signal level for each step.

2. The infrared security sensor device as claimed in claim 1, in which the light projector and the light receiver have respective removable coverings; and in which the light projecting power control unit includes a covering transmittance adjusting sector for automatically adjusting the light projecting power in dependence on the amount of the light transmittance reduced by the covering, in addition to the manual adjustment or the automatic adjustment of the light projecting power during the optical axis adjustment, under a condition in which the coverings of the light projector and the light receiver are removed, when the coverings are mounted on the light projector and the light receiver subsequent to termination of the optical axis.

3. The infrared security sensor device as claimed in claim 1, in which the light projecting power control unit includes an automatic adjusting sector for automatically adjusting the stepwise switching of the light projecting power at the time of the alert status such that in dependence on an environment of a site of installation the light projecting power of the light projector is automatically switched to one of the plurality of the steps at the time of the alert status.

4. The infrared security sensor device as claimed in claim 1, in which the light projecting power control unit includes a manual adjusting sector for manually adjusting the stepwise switching of the light projecting power at the time of the alert status such that in dependence on an environment of a site of installation the light projecting power of the light projector is manually switched to one of the plurality of the steps at the time of the alert status.

5. The infrared security sensor device as claimed in claim 1, in which the manual adjusting sector is exposed when the covering is removed.

* * * * *